United States Patent [19]

Esaian et al.

[11] 4,203,202

[45] May 20, 1980

[54] METHOD OF MAKING STANDBY PRIMARY CURRENT SOURCES

[76] Inventors: Levon P. Esaian, prospekt Mira, 182, korpus 3, kv. 9, Moscow; Valery S. Sokolov, ulitsa Ordzhonikidze, 55/39, kv. 24, Kalinin; Dina V. Kurygina, prospekt Mira, 99, kv. 39, Moscow; Fedor F. Zubanov, Leningradskoe shosse, 54/2, kv. 26, Kalinin; Valentin N. Aleshin, ulitsa Fabrichnaya, 7, kv. 32, Moskovskaya oblast, poselok Pravdinsky; Gennady V. Bolshov, ulitsa Bogdanova, 24-a, kv. 21, Kalinin; Igor S. Kuzyko, Yaroslavskoe shosse, 67, kv. 83, Moscow; Oleg A. Fedotov, ulitsa Tomary Ilinoi, 7, kv. 43, Kalinin; Ninel K. Belysheva, ulitsa Akademika Komarova, 13, kv. 52, Moscow; Alexei M. Anosov, Proletarskaya naberezhnaya, 11, kv. 196, Kalinin; Alexei I. Antonov, ulitsa Erofeeva, 8, kv. 4, Kalinin; Viktor I. Terentiev, Volokolamsky prospekt, 43, kv. 17, Kalinin; Viktor A. Naumenko, ulitsa Novo-Alexeevskaya, 48, kv. 12, Moscow; Boris V. Akimov, prospekt Lenina, 75 "A", kv. 30, Leninsk-Kuznetsky Kemerovskoi oblasti, all of U.S.S.R.

[21] Appl. No.: 880,497

[22] Filed: Feb. 23, 1978

[51] Int. Cl.² .............................................. H01M 6/44
[52] U.S. Cl. ................................. 29/623.2; 429/155

[58] Field of Search .................. 29/623.1, 623.2, 623.5; 429/155, 149, 150, 151, 152, 153, 154; 264/272

[56] References Cited

U.S. PATENT DOCUMENTS

| 594,313 | 11/1897 | Ashley | 429/155 |
| 1,341,469 | 5/1920 | Kershaw | 429/154 |
| 2,416,576 | 2/1947 | Franz et al. | 429/155 |
| 2,496,709 | 2/1950 | Gelardin | 429/155 |
| 2,654,794 | 10/1953 | Zaugg | 429/154 |
| 2,834,827 | 5/1958 | Emeriat | 429/155 |
| 4,125,680 | 11/1978 | Shropshire et al. | 429/154 |

FOREIGN PATENT DOCUMENTS

| 42-21779 | 10/1967 | Japan | 29/623.2 |
| 42-21780 | 10/1967 | Japan | 29/623.2 |

*Primary Examiner*—Daniel C. Crane
*Attorney, Agent, or Firm*—Haseltine, Lake & Waters

[57] ABSTRACT

The method of making standby water-activated primary current sources, according to the invention, resides in that concurrently with hermetical sealing of the ends and edges of the negative electrodes, a flanged rim is provided along the perimeter of each of the negative electrodes, the height of said flanged rim being in excess of the thickness of the bipolar electrode and the separator. The flanged rim forms an angle from 90° to 180° with the electrode surface and is provided with at least one shoulder for passing the water and gases and for current leadout. The bipolar electrodes are interlaid with the separators, whereupon the adjacent portions of the flanged rims are welded together into an integral block of bipolar electrodes. The proposed method makes it possible to completely dispense with manual labor and simplify the production techniques.

2 Claims, 7 Drawing Figures

METHOD OF MAKING STANDBY PRIMARY CURRENT SOURCES

The present invention relates generally to the art of electrical engineering and more specifically to a method of making standby water-activated primary current sources.

The invention is applicable largely for making standby primary current sources used as self-contained power sources for the electrical equipment of radiosondes and emergency survival aids.

The heretofore used methods of making primary current sources involve a great number of complicated manual operations which are unamenable to mechanization.

A prior-art method of making standby water-activated primary current sources is known according to which the ends and edges of a negative electrode with a current-conducting substrate, said electrode making part of a bipolar electrode, are hermetically sealed with a water-repellent insulant, at least two electrodes are provided with current leadouts, the bipolar electrodes are interlaid with the separator in such a way that the negative electrode of one bipolar electrode is separator-insulated from the positive electrode of the adjacent bipolar electrode, whereupon the electrodes are held together into at least one integral block (cf., Japanese Patent No. 42-21780, 1967).

According to the above method, first, a frame is prepared having a hole the size of which exceeds that of the positive and negative electrodes, whereupon separators are cemented to said frame. Next, the positive electrode is placed on the separators of the frame, while the negative electrode with a current-conducting substrate is a tight or cemented fit in the frame, whereupon the ends and edges of the electrodes are rolled-in. Thus, a bipolar electrode is provided with its ends and edges being hermetically sealed. Thereupon, the bipolar electrodes are cemented together into an integral block which is then inserted into a casing provided with two current leadouts. To assemble a battery from a number of such blocks, a common jar or container is to be made, subdivided by partition walls into a number of compartments, each being provided with passages for water and escaping gases.

The above method involves may manual operations, such as placing the positive and negative electrodes into the frame, their mutual aligning and cementing the separators. The method does not permit producing primary current sources of different electrical parameters, using the same production equipment.

It is a principal object of the present invention to simplify the production techniques used in making standby water-activated primary current sources.

This object is accomplished by that in a method of making standby water-activated primary current sources, whereby the ends and edges of a negative electrode with a current-conducting substrate, said electrode forming part of a bipolar electrode, are hermetically sealed with a water-repellent insulant, at least two electrodes are provided with current leadouts, the bipolar electrodes are interlaid with separators in such a manner that the negative electrode of one bipolar electrode is separator-insulated from the positive electrode of an adjacent bipolar electrode, whereupon the electrodes are held together forming at least one integral block, wherein, according to the invention, a flanged rim is provided along the perimeter of each of the negative electrodes concurrently with hermetical sealing of the ends and edges of said negative electrodes, the height of said flanged rim exceeding the thickness of the bipolar electrode and of the separator, and said flanged rim forms an angle from 90° to 180° with the surface of the electrode and is provided with at least one shoulder for passage of water and gases and current leadout, after which the adjoining portions of the flanged rims are welded together into an integral block of bipolar electrodes.

It is expedient that the blocks of bipolar electrodes be welded together.

The proposed method of making standby water-activated primary current sources enables one to completely dispense with manual labour and eliminate inefficient operations, i.e., considerably simplify the production techniques. The proposed method makes it possible to produce primary current sources differing in electrical parameters.

In what follows, the invention is illustrated by a specific exemplary embodiment thereof with reference to the accompanying drawings, wherein.

Figure 1:
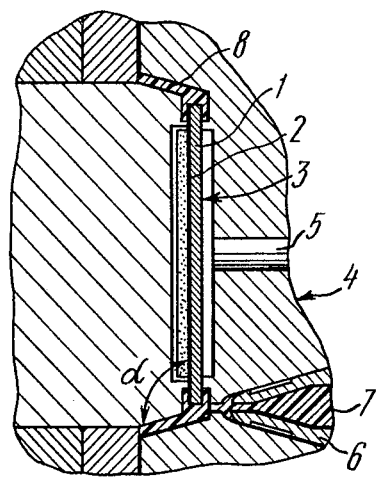
FIG. 1 is a longitudinal section view of a unit of a casting machine for making a flanged rim along the electrode perimeter, according to the invention.

The method of making standby water-activated primary current sources, according to the invention resides in the following.

A negative electrode 1 (FIG. 1) with a current-conducting substrate 2, which is in effect a part of a bipolar electrode 3, or the bipolar electrode 3 as a whole, is placed in a press-mold 4 of a casting machine. Then, the electrode 1 is centered to provide a reliable sealing of the ends and edges thereof. To this end, a special device is used (not shown) to fit the electrode 1 into the press mold 4 and hold it in the aligned position till the press mold 4 gets locked by vacuum established through a port 5. Next, a water-repellent insulant 7 is force-fed through an injection nozzle 6 into the press mold 4, said insulant being cooled therein to solidify. As a result, the ends and edges of the electrode 1 are covered by the insulant 7 which is liable to set while being solidified, thus reliably sealing the ends and edges of the electrode 1 with the current-conducting substrate 2.

Figure 2:
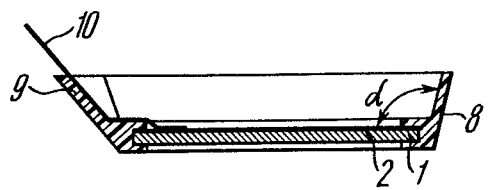
FIG. 2 is a cross-sectional view of a negative electrode with a flanged rim provided along the perimeter thereof, according to the invention.

The press mold 4 is so shaped that a flanged rim 8 is produced along the perimeter of the electrode 1 concurrently with hermetical sealing of the ends and edges thereof. The flanged rim 8 forms an angle α with the surface of the electrode 1, said angle ranging within 90 and 180 degrees of an arc and being predetermined to suit the shape of the press mold 4. The flanged rim 8 has at least one shoulder 9 (FIG. 2). The number of shoulders 9 and their shape depend upon the shape of the press mold 4 (FIG. 1). The shoulder 9 (FIG. 2) is adapted for passage of water and gases to pass and to accommodate a current leadout 10, with which the negative electrode 1 is then provided. The width of the shoulder 9 is so selected as to provide for an adequate flow velocity of water and gases and minimize current leakage. The current leadout 10 is welded to the current-conducting substrate 2.

Figure 3:
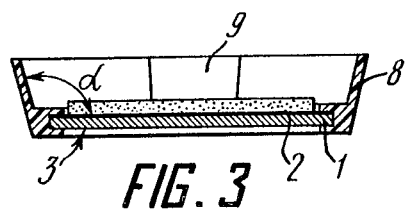
FIG. 3 is a cross-sectional view of a bipolar electrode with a flanged rim provided along the perimeter thereof, according to the invention.

FIG. 2 illustrates an embodiment of the hermetically sealed negative electrode 1 with a current-conducting substrate 2, whereas FIG. 3 represents an embodiment of the hermetically sealed bipolar electrode 3.

Figure 4:
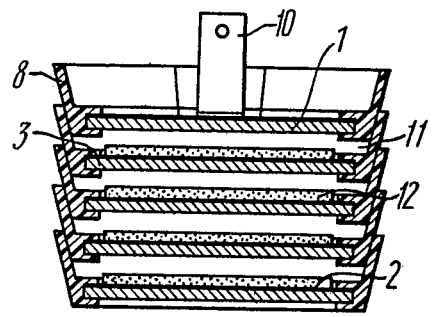
FIG. 4 is a cross-sectional view of a block of bipolar electrodes, according to the invention.

Then, the hermetically sealed bipolar electrodes 3 (FIG. 4) are interlaid with a separator 11 in such a way that the negative electrode 1 of one of the bipolar electrodes 3 is insulated by the separator 11 from a positive electrode 12 of an adjacent bipolar electrode 3. The separator 11 is made of a high-fibrillary cellulose material preimpregnated with an aqueous solution of potassium chloride, glycerol and starch, and dried. When sealing the electrodes, the height of the flanged rims 8 is selected to exceed the thickness of the bipolar electrode 3 and of the separator 11, which is likewise to be determined by the shape of the press mold 4 (FIG. 1). When placing the bipolar electrodes 3 in position, the flanged rims 8 serve for aligning the separators 11 and the electrodes 3. Thereupon, the electrodes 3 placed in position are welded together along the adjoining portions of the flanged rims 8 into at least one integral block (FIG. 13).

Figure 6:
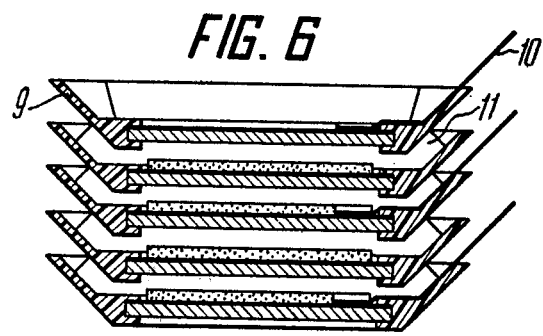
FIG. 6 is a cross-sectional view of a block of bipolar electrodes whose flanged rims are provided with two shoulders for passage of water and gases and current leadout according to the invention.
Figure 5:
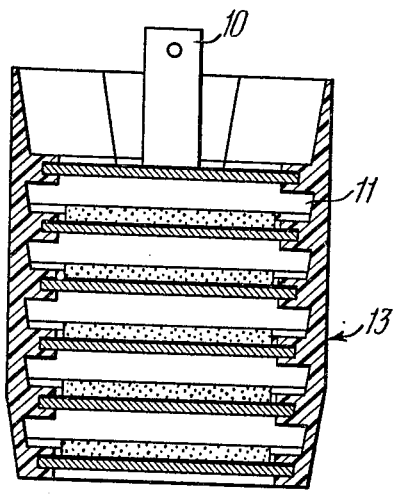
FIG. 5 shows a block of bipolar electrodes with their flanged rims welded together, according to the invention.

At least two electrodes 1 are provided with current leadouts 10 (FIG. 6), though the number of leadouts may vary depending upon the required potential.

Figure 7:
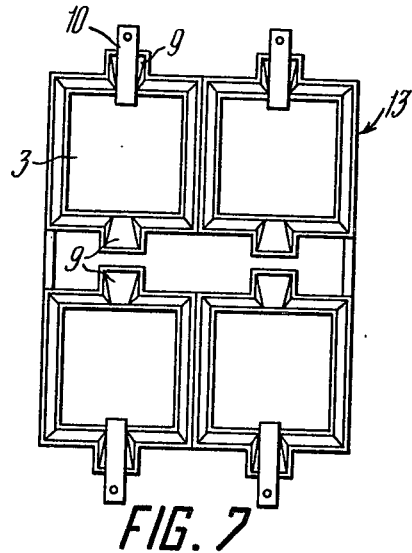
FIG. 7 shows the blocks of bipolar electrodes welded together.

The blocks 13 (FIG. 7) are welded together to define a sturdy solid structure.

The proposed method of making standby water-activated primary current sources enables one to completely dispense with manual labour and simplify the production techniques.

What is claimed is:

1. A method of producing standby water-activated primary current sources, comprising the steps of: hermetically sealing, with a water-repellent insulant, ends and edges of each of a plurality of negative electrodes forming part of a bipolar electrode; shaping a flanged rim along the perimeter of each of said negative electrodes concurrently with said hermetical sealing of said ends and edges of each of said negative electrodes, said flanged rim forming a continuous inclined surface with respect to the electrode surface and its height exceeding the thickness of the bipolar electrode and of a separator; forming at least one inclined shoulder on the flanged rim for passage of water and gases and for current leadout, concurrently with said shaping of said flanged rim, said inclined shoulder being formed at an angle different from the angle of inclination of the flange rim; providing current leadouts on at least two electrodes; interlaying said bipolar electrodes with separators in such a way that the negative part of one bipolar electrode is insulated with the separator from the positive part of an adjacent bipolar electrode; stacking said bipolor electrodes such that the inclined surfaces of the flanged rims of adjacent bipolar electrodes are in contacting relationship; welding together the adjoining surfaces of the flanged rims into an integral block of bipolar electrodes, said welding occuring along opposed inclined surfaces of the flanged rims.

2. A method as defined in claim 1 including the step of welding together blocks of bipolar electrodes.

* * * * *